US011960721B2

(12) United States Patent
Shivanand et al.

(10) Patent No.: US 11,960,721 B2
(45) Date of Patent: Apr. 16, 2024

(54) DYNAMIC STORAGE IN KEY VALUE SOLID STATE DRIVE

(71) Applicant: SAMSUNG ELECTRONICS CO., LTD., Suwon-si (KR)

(72) Inventors: Srikanth Tumkur Shivanand, Tumkur (IN); Kapil Garg, Bangalore (IN); Paul Justin K, Chennai (IN); Sarath Chandra Reddy, Pradesh (IN); Sri Gobicca Kms, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 17/859,192

(22) Filed: Jul. 7, 2022

(65) Prior Publication Data

US 2023/0019465 A1 Jan. 19, 2023

(30) Foreign Application Priority Data

Jul. 7, 2021 (IN) .............................. 202141030420

(51) Int. Cl.
*G06F 3/06* (2006.01)

(52) U.S. Cl.
CPC .......... *G06F 3/0608* (2013.01); *G06F 3/0604* (2013.01); *G06F 3/0631* (2013.01); *G06F 3/0638* (2013.01); *G06F 3/0679* (2013.01)

(58) Field of Classification Search
CPC .... G06F 3/0608; G06F 3/0604; G06F 3/0631; G06F 3/0638; G06F 3/0679
See application file for complete search history.

(56) References Cited

U.S. PATENT DOCUMENTS

| 11,474,699 | B1* | 10/2022 | Saha | H04L 9/0643 |
| 2014/0304525 | A1* | 10/2014 | Novak | G06F 12/1408 713/193 |
| 2018/0357234 | A1* | 12/2018 | De | G06F 3/061 |
| 2019/0057140 | A1* | 2/2019 | Pitchumani | G06F 3/0614 |
| 2019/0199690 | A1* | 6/2019 | Klein | H04L 63/0428 |
| 2019/0243903 | A1* | 8/2019 | Yang | G06F 12/0246 |
| 2020/0014688 | A1* | 1/2020 | Kohli | H04L 9/0891 |
| 2021/0011634 | A1* | 1/2021 | Tumkur Shivanand | G06F 3/0622 |

OTHER PUBLICATIONS

Y. - T. Chen et al. "Co-Optimizing Storage Space Utilization and Performance for Key-Value Solid State Drives," in IEEE Transactions on Computer-Aided Design of Integrated Circuits and Systems, vol. 38, No. 1, pp. 29-42, Jan. 2019, doi: 10.1109/TCAD.2018.2801244. (Year: 2018).*

\* cited by examiner

*Primary Examiner* — William E. Baughman
(74) *Attorney, Agent, or Firm* — F. CHAU & ASSOCIATES, LLC

(57) ABSTRACT

A method for dynamically storing keys and values includes receiving a request for storing one or more keys in a key value Solid State drive (KV-SSD). The method further includes performing a storage operation for storing each key of the one or more keys in a node of a data structure of the KV-SSD. The storage operation includes allocating a first region in the node for storing the key, such that a size of the first region is equal to a size of the key. The storage operation further includes allocating a second region in the node for storing key metadata associated with the key, such that the second region is of a predetermined size. The storage operation further includes storing the key in the first region and the key metadata in the second region of the node.

20 Claims, 5 Drawing Sheets

502 → Conventional Technique

| | | | | | | | | | Total |
|---|---|---|---|---|---|---|---|---|---|
| Key size | 16 | 256 | 256 | 7 | 32 | 8 | 8 | 8 | 16 | 607 |
| Keys space | 256 | 256 | 256 | 256 | 256 | 256 | 256 | 256 | 256 | 2304 |

504 → Proposed Subject Matter

| | | | | | | | | | Total |
|---|---|---|---|---|---|---|---|---|---|
| Key size | 16 | 256 | 256 | 7 | 32 | 8 | 8 | 8 | 16 | 607 |
| Key space (Key+key metadata) | 19 | 259 | 259 | 10 | 35 | 11 | 11 | 11 | 19 | 634 |

DYNAMIC STORAGE IN KEY VALUE SOLID STATE DRIVE

CROSS-REFERENCE TO RELATED APPLICATION

This U.S. nonprovisional application claims priority under 35 U.S.C § 119 to Indian Patent Application No. 202141030420, filed on Jul. 7, 2021, the disclosure of which is hereby incorporated by reference in its entirety.

Technical Field

The present disclosure, in general, relates to storing keys in a storage/memory and in particular relates to storing keys in key value solid state drives.

Discussion of the Related Art

Key value Solid State Drives (KV SSDs) support storage of key value data therein. Key value data typically include one or more keys and values associated with the keys. When stored in a KV SSD, in an example, the keys are stored in a node of a given data structure implemented in the KV SSD. Many different known data structures may be used to implement the storage of keys and values in a KV SSD.

In some KV SSDs that implement a B+ tree data structure, a technique for storing the keys in a given node involves storing each of the keys in a corresponding region of the node. This region, or space, in the node is of a predetermined fixed size. Sometimes this storage schema leads to wasted storage space in the node. For instance, consider an example where the predetermined size is 256 bytes and a key to be stored has a size of 8 bytes. In this case, most of the 256 bytes available will go unused.

There is a need in the art to provide a storage schema with increased space utilization.

SUMMARY

The following summary is provided to introduce a selection of concepts, which are further described in the detailed description included herein. This summary is not intended to identify key or essential inventive concepts, and nor is it intended for determining the scope of the invention.

The storage schema used in some comparative examples of systems configured to store key-value pairs may cause wasted space. For example, in a KV SSD that implements a B+ tree data structure, 256 bytes of key space may be allocated for every key. However, keys are often not of a consistent size. A key may be, for example, 7 bytes, 8 bytes, 128 bytes, etc.; i.e., of a smaller size than the allocated space. This disclosure provides embodiments of a method for efficiently storing key-value pairs. In an embodiment, the method fills a memory node with keys from one end of the node, and meta data about the keys are filled from the other end of the node. The keys and their metadata converge toward the center. The method(s) described herein provide a way to utilize the available space in the node to its maximum.

In an embodiment, a method is disclosed. The method includes receiving a request for storing one or more keys in a key value Solid State drive (KV-SSD). The method further includes performing a storage operation for storing each key of the one or more keys in a node of a data structure of the KV-SSD. For each key of the one or more keys, the storage operation includes allocating a first region in the node for storing the key, such that a size of the first region is equal to a size of the key. The storage operation further includes allocating a second region in the node for storing key metadata associated with the key, such that the second region is of a predetermined size. Furthermore, the storage operation includes storing the key in the first region and the key metadata in the second region of the node.

In another embodiment, a system is disclosed. The system includes a request handler configured to receive a request for storing a plurality of keys in a key-value Solid State drive (KV-SSD). The system further includes a memory controller configured to perform a storage operation for storing each key of the plurality of keys in a node of a data structure of the KV-SSD. In the storage operation, the memory controller is configured to allocate a first region in the node for storing the key, such that a size of the region is equal to a size of the key. Furthermore, the memory controller is configured to allocate a second region in the node for storing key metadata associated with the key, such that the second region is of a predetermined size. Furthermore, the memory controller is configured to store the key in the first region and the key metadata in the second region of the node.

To further clarify features of the present inventive concepts, a more particular description of the invention will be rendered by reference to specific embodiments thereof, which are illustrated in the appended drawings. It is appreciated that these drawings depict example embodiments of the invention and are therefore not to be considered limiting of its scope. The inventive concepts will be described and explained with additional specificity and detail with the accompanying drawings.

BRIEF DESCRIPTION OF THE DRAWINGS

The above and other aspects and features of the present disclosure will become more apparent by describing in detail example embodiments thereof while referring to the attached drawings, in which:

FIG. 5 illustrates a comparison result, according to an embodiment of the present disclosure.

Figure 1:
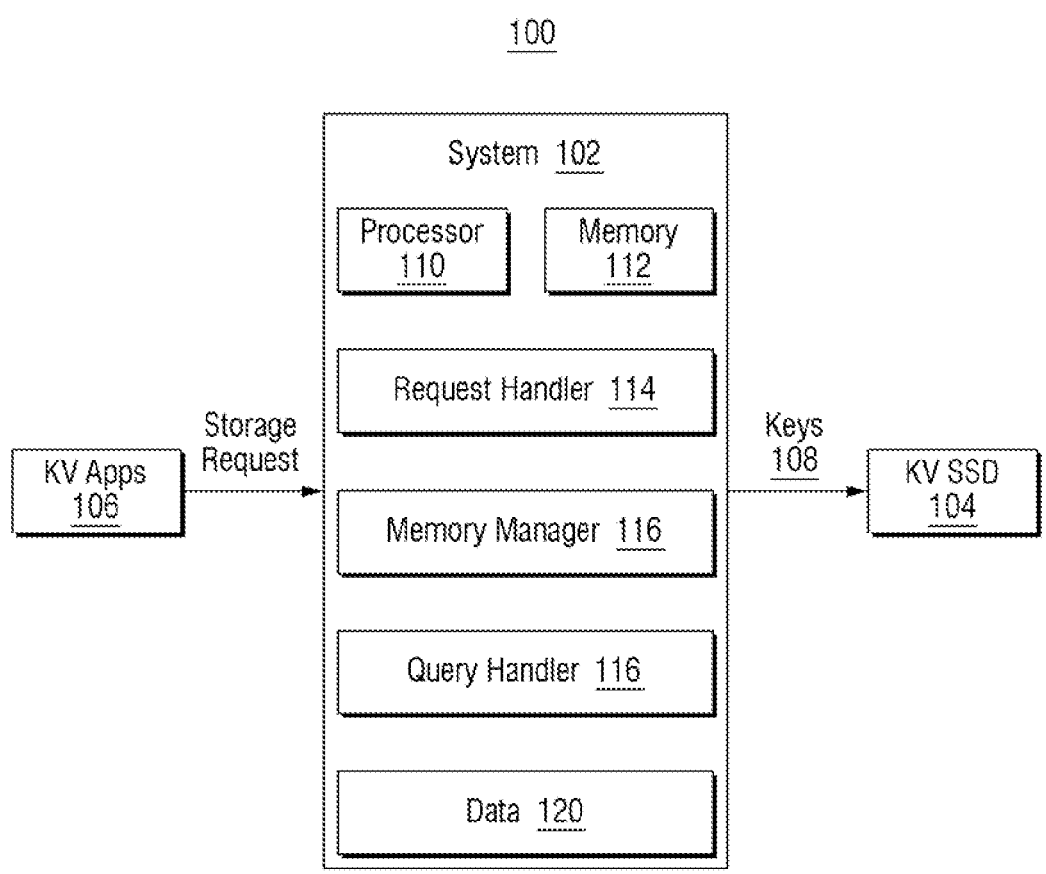
FIG. 1 illustrates a network environment that implements a system for storing keys in a Key Value Solid State Drive (KV SSD), according to embodiments of the present disclosure.

It will be appreciated that elements in the drawings are illustrated for simplicity, and may not have been necessarily been drawn to scale. For example, the flow charts illustrate embodiments of methods in terms of the most prominent steps involved to help to improve understanding of aspects of the present inventive concepts. Furthermore, in terms of the construction of the device, one or more components of the device may have been represented in the drawings by conventional symbols, and the drawings may show only those specific details that are pertinent to understanding the embodiments of the present inventive concepts so as not to obscure the drawings with details that will be readily apparent to those of ordinary skill in the art having the benefit of the description herein.

DETAILED DESCRIPTION OF THE EMBODIMENTS

For the purpose of promoting an understanding of the principles of the inventive concepts, references will now be made to the embodiments illustrated in the drawings and specific language will be used to describe the same. It will be understood that no limitation of the scope of the inventive concepts is thereby intended, and alterations and modifications to the illustrated systems and further applications of the principles of the inventive concepts as illustrated may be made without materially departing from the scope of the present inventive concepts.

It will be understood by those skilled in the art that the foregoing general description and the following detailed description are explanatory of the inventive concepts and are not intended to be restrictive thereof.

Reference throughout this specification to "an aspect", "another aspect" or similar language may mean that a particular feature, structure, or characteristic described in connection with the embodiment is included in at least one embodiment of the present inventive concepts. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" or "includes . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which the inventive concepts pertain. The system, methods, and examples provided herein are illustrative only and not intended to be limiting.

Embodiments of the present inventive concepts will be described below in detail with reference to the accompanying drawings.

FIG. 1 illustrates an environment 100 which includes a system 102, according to one or more embodiments of the present disclosure. The environment 100 further illustrates a key-value (KV) Solid State Drive (KV SSD) 104 and one or more KV applications 106. In an example, the system 102 may be configured to store a plurality of keys pertaining to a KV application 106 in the KV SSD 104. The system 102 may be implemented, for example, in a computing device, such as, a data server, a server, a data store, a laptop, a desktop computer, and the like.

In an example, the system 102 includes a processor 110, memory 112, a request handler 114, a memory manager 116, a query handler 118, and data 120. In an example, the memory 112, the request handler 114, the memory manager 116, and the query handler 118 are coupled to the processor 110. The processor 110 may be a single processing unit or a number of units, all of which could include multiple computing units. The processor 110 may be implemented as one or more microprocessors, microcomputers, microcontrollers, digital signal processors, central processing units, state machines, logic circuitries, and/or any devices that manipulate signals based on operational instructions. The processor 110 is configured for multiple functionalities, including the ability to fetch and execute computer-readable instructions and data stored in the memory 112.

The memory 112 may include a non-transitory computer-readable medium including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The request handler 114, the memory manager 116, and the query handler 118, amongst other things, include routines, programs, objects, components, data structures, etc., which can perform particular tasks or implement data types. The request handler 114, the memory manager 116, and the query handler 118 may also be implemented as, for example, signal processor(s), state machine(s), logic circuitries, and/or any other device or component that manipulate signals based on operational instructions. Furthermore, the request handler 114, the memory manager 116, and the query handler 118 may be implemented in hardware, instructions executed by a processing unit, or by a combination thereof. The processing unit may be or include a computer, a processor, such as the processor 110, a state machine, a logic array or any other suitable devices capable of processing instructions. The processing unit can be a general-purpose processor that is configured to execute instructions to cause the general-purpose processor to perform the required tasks or, the processing unit can be dedicated to perform the required functions.

In some embodiments of the present disclosure, the request handler 114, the memory manager 116, and the query handler 118 may be machine-readable instructions (software) which, when executed by a processor/processing unit, perform any of the described functionalities. The data 120 serves, amongst other things, as a repository for storing data processed, received, and generated by the processor 110, the request handler 114, the memory manager 116, or the query handler 118.

In an example, the KV applications 106 are configured to, amongst other things, manage, generate, update, or delete, KV data during their respective operations. The KV data may include key value pairs. With respect to the aforementioned operations, the KV applications 106 may make corresponding requests to the system 102. For instance, in an example embodiment, to store keys 108 in the KV SSD 104, a KV application 106 may make a storage request to the system 102.

In an example embodiment, the request handler 114 may be configured to receive the storage request for storing the plurality of keys 108 in the KV SSD 104. In an example, the request handler 114 may store the storage request in the data 120. In an example, the storage request may include the keys 108 that are to be stored in the KV SSD 104. In an example, the storage request may include a link or a path to a storage from where the system 102 may obtain the keys 108 that are to be stored in the KV SSD 104.

Accordingly, in an example embodiment, the memory manager 116 may be configured to obtain the keys 108, from the storage request and/or from the link/path provided therein. In other words, the memory manager 116 may obtain the keys 108 based on the storage request.

Figure 4:
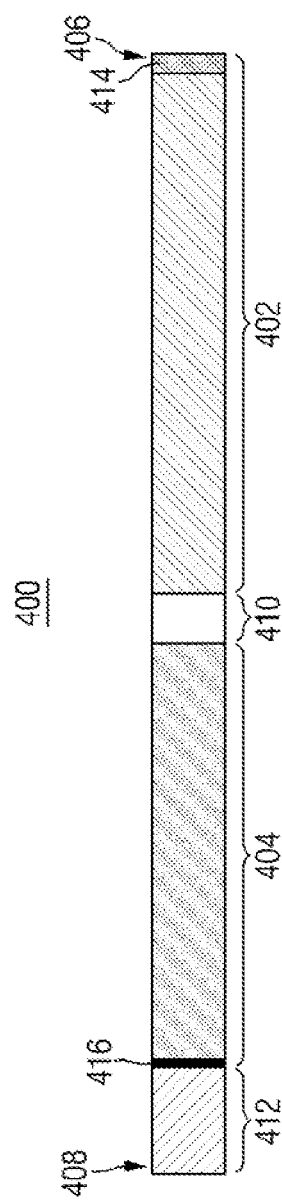
FIG. 4 illustrates a structure of a node, according to an embodiment of the present disclosure.

In an example embodiment, the memory manager 116 may be configured to perform a storage operation which may store each key of the plurality of keys 108 in a node of a data structure of the KV SSD 104. The following description applies to an embodiment with reference to FIG. 4, where FIG. 4 illustrates a node 400 of a data structure of the KV SSD 104.

In an example embodiment, the node 400 includes at least a key region 402 and a key metadata region 404. In an example, the memory manager 116 may store the plurality of keys 108 in the key region 402. Furthermore, the memory manager 116 may store key metadata associated with each of the plurality of keys 108 in the key metadata region 404. In an example embodiment, the key metadata associated with a key 108 may include an offset value associated with the key 108 and a size of the key 108. In an example, the offset value is indicative of a position of the key 108 in the node 400. In an example embodiment, the key region 402 commences from a first end 406 of the node 400 and the key metadata region 404 commences from a second end 408 of the node 400. Furthermore, in an example embodiment, the second end 408 may be opposite to the first end 406.

Furthermore, in an example embodiment, the node 400 further includes a safe region 410 positioned in-between the key region and the key metadata region. The safe region 410 may be understood as region of predetermined size present in the node 400 which prevents overlapping between key region 402 and the key metadata region 404. Furthermore, in an example embodiment, the node 400 further includes a node metadata region 412. The node metadata region 412 includes information about occupancy of the node 400.

The following description applies to the storage operation in reference to only one key 108. As would be appreciated, the other keys in the plurality of keys 108 would be stored in a similar manner.

In an example embodiment, in the storage operation, the memory manager 116 may be configured to allocate a first region 414 in the node 400. The first region 414 may be allocated such that a size of the first region 414 is equal to a size of the key 108. Thereafter, the memory manager 116 may be configured to allocate a second region 416 in the node 400 for storing key metadata associated with the key 108. The second region 416 may be allocated such that the second region 416 is of a predetermined size. In an example embodiment, the predetermined size of the second region 416 is 3 bytes.

In an example embodiment, once the memory manager 116 has allocated the first region 414 and the second region 416, the memory manager 116 may then store the key in the first region 414 and the key metadata in the second region 416.

In an example embodiment, the memory manager 116 may be configured to store the plurality of keys 108 in the key region 402 starting from the first end 406 of the node 400. In an embodiment, the memory manager 116 may be configured to store the key metadata associated with each of the keys 108 starting from the second end 408 of the node 400.

According to aspects of the present disclosure, the memory manager 116 stores the plurality of keys 108 from one end of the node and the corresponding key metadata from another end of the node. The key metadata for each of the keys 108 helps maintain the order and keep track of the available space in the node. As per the aspects described above, the keys 108 take up the exact space required and the corresponding key metadata is constant, and resides in the other end of the node. Thus for varying workloads, the dynamic order ensures maximum key space utilization within the node.

In an example, the KV application 106 may send a request to delete at least one key in the plurality of keys 108. In an example embodiment, the request handler 114 may receive the request from the KV application 106. In response to the receiving of the request, in an example, the memory manager 116 may be configured to delete the at least one key and the associated metadata from the node 400.

In an example embodiment, the memory manager 116 may be configured to perform a fragmentation process on the node 400. In the fragmentation process, the memory manager 116 may be configured to update positions of one or more keys from the plurality of keys 108 in the key region 402. For example, the fragmentation process may relate to a process that defragments one or more portions of the node 400. Accordingly, the memory manager 116 may be configured to update corresponding key metadata associated with the one or more keys from the plurality of keys 108 based on a new position of each of the one or more keys.

In an example embodiment, the request handler 114 may be configured to receive a further request for storing another key in the node 400. In an example embodiment, the memory manager 116 may be configured to determine if a size of the next key is greater than available space in the node. To that end, in an example, the memory manager 116 may determine the available space based on the node metadata region 412. Subsequently, the memory manager 116 may compare the available space with the size of the next key. In an example, if the size of the next key is determined to be greater than the available space, the memory manager 116 may be configured to perform the fragmenting process, as described above. After performing the fragmentation process, the memory manager 116 may again determine the available space and compare it with the size of the next key. In case, the size of the next key is now determined to be less than the available space, the memory manager 116 may be configured to store the next key in the node 400. In another example, if the size of the next key is still greater than the available space, the memory manager 116 may cancel the storage procedure of the next key and may notify the KV app 106.

In an example embodiment, the request handler 114 may be configured to receive a range query call from the KV application 106. The query handler 118 may be configured to service the range query call based on the key metadata region 404. During the servicing of the range query call, the query handler 118 may be configured to execute binary search on the key metadata region 404. Herein, in the binary search, the query handler 118 looks for the keys represented by the key metadata.

Figure 2:
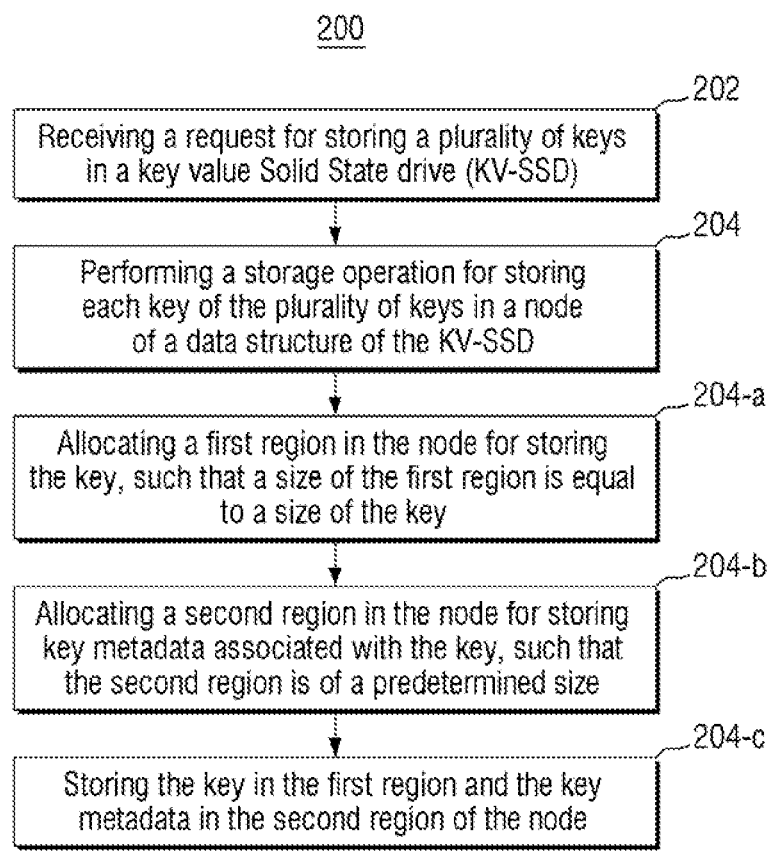
FIG. 2 illustrates a method of storing keys in a KV SSD, according to embodiment of the present disclosure.

FIG. 2 illustrates a method 200 of storing keys in a KV SSD, according to an embodiment of the present disclosure. The method 200 may be implemented using one or more components of the system 102. Repetitive description of components that have already been explained in detail with reference to description of FIGS. 1 and 4 above may be omitted in the following description.

At step 202, a request for storing a plurality of keys in the KV SSD is received. In an example, the request for storing the keys may be sent by a KV application, such as the KV application 106. In an example, the request handler 114 may receive the storage request from the KV application 106.

At step 204, a storage operation for storing each key of the plurality of keys in a node of a data structure of the KV SSD is performed. In an example, the memory manager 116 may perform the storage operation. In an example, the node includes at least a key region and a key metadata region. The key region stores the plurality of keys and the key metadata region stores the key metadata associated with each of the plurality of keys. Furthermore, the key region commences from a first end of the node and the key metadata region commences from a second end of the node. In an example, the second end is opposite to the first end.

Furthermore, in an example, the node further includes a safe region positioned in-between the key region and the key metadata region. Furthermore, in an example embodiment, the node further includes a node metadata region which includes information about occupancy of the node.

Referring back to the storage operation, the storage operation includes various steps as described below.

At step 204-a of the storage operation, a first region in the node is allocated for storing the key, such that a size of the first region is equal to a size of the key.

At step 204-b of the storage operation, a second region in the node is allocated for storing key metadata associated with the key, such that the second region is of a predetermined size. In an example, the second region may have a size of 3 bytes.

At step 204-c of the storage operation, the key is stored in the first region and the key metadata is stored in the second region of the node.

In an example embodiment, the method 200 further includes storing the plurality of keys in the key region starting from the first end of the node. For example, with reference to FIG. 4, a first key may be stored at or adjacent to the first end 406 of the node 400, and the next key to be stored may be stored adjacent to the first key, and so on. Furthermore, in an example embodiment, the method 200 further includes storing the key metadata associated with each of the plurality of keys in key metadata region in a similar fashion starting from the second end of the node.

In an example embodiment, the method 200 further includes receiving a range query call from the KV application. In an example embodiment, the method 200 further includes servicing the range query call based on the key metadata region.

In a an example embodiment, the method 200 further includes receiving a request to delete at least one key from the plurality of keys. In an example embodiment, the method 200 further includes deleting the at least one key and the associated metadata from the node in response to the receiving of the request.

As would be understood, post deletion, there may be empty spaces in between the keys stored in the key region. Accordingly, a fragmentation process may be performed as described below in the description of FIG. 3.

Figure 3:
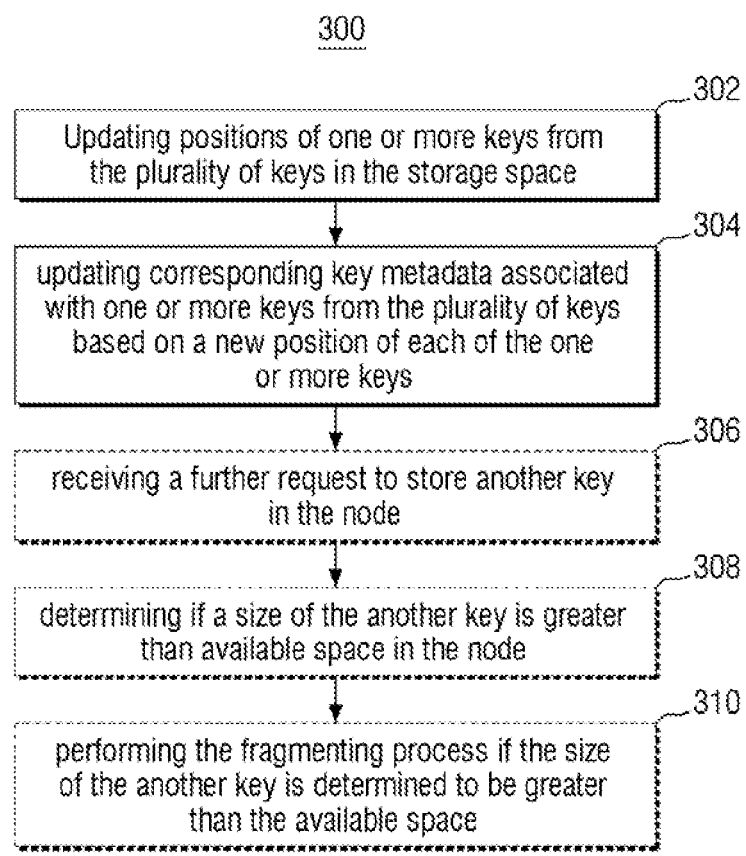
FIG. 3 illustrates a fragmentation process of a node, according to an embodiment of the present disclosure.

FIG. 3 illustrates a method 300 of fragmentation of a node, according to an embodiment of the present disclosure. The method 300 may be implemented using one or more components of the system 102. For the sake of brevity, description of components that have already been described in detail with reference to description of FIGS. 1, 2, and 4 above may be omitted in the following description.

The method 300 starts at step 302, where positions of one or more keys from the plurality of keys in the key region are updated. Furthermore, at step 304, corresponding key metadata associated with the one or more keys from the plurality of keys are updated based on a new position of each of the one or more keys.

Accordingly, the available space in a given node may be optimized. In an example, the fragmentation process of method 300 may occur automatically, post deletion of a key. In an example, the fragmentation process may occur based on a user input. In an example, the fragmentation may occur in response to processing of a further request as explained below.

In an example, at step 306, the method 300 includes receiving a further request to store another key in the node. Accordingly, at step 308, it is determined if a size of the next key is greater than available space in the node. At step 310, the fragmenting process is performed if the size of the next key is determined to be greater than the available space.

FIG. 5 illustrates a comparison result 500, according to an embodiment of the present disclosure. In the first table 502, the storage space utilized as per conventional techniques for storing keys in a node of a data structure of a KV SSD is shown. The second table 504 illustrates the storage space utilized as per the aspects of the proposed subject matter for storing keys in a node of a data structure of a KV SSD, such as the KV SSD 104.

As may be seen, as per the conventional technique, a total of 2304 bytes are utilized for storing keys having a total size of 607 bytes. Whereas, in a non-limiting example, a total of 634 bytes are utilized for storing keys having a total size of 607 bytes. Thus, it will be appreciated the aspects of the proposed subject matter provide for a solution to optimize the storage space provided in a node of a given KV SSD.

While specific language has been used to describe the present disclosure, any limitations arising on account thereto, are not intended. As would be apparent to a person in the art, various working modifications may be made to the method and/or system in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method comprising:
receiving a request to store one or more keys in a key value Solid State drive (KV-SSD);
performing a storage operation for storing the one or more keys in a node of a data structure of the KV-SSD, wherein the storage operation for each key in the one or more keys comprises:
allocating a first region in the node for storing the key, such that at a size of the first region is equal to a size of the key;
allocating a second region in the node for storing key metadata associated with the key, such that the second region is of a predetermined size; and
storing the key in the first region and the key metadata in the second region of the node.

2. The method according to claim 1, wherein the key metadata comprises an offset value associated with the key and a size of the key, and wherein the offset value is indicative of a position of the key in the node.

3. The method according to claim 2, wherein the node comprises at least a key region and a key metadata region, wherein the key region is configured to store the plurality of keys, and wherein the key metadata region is configured to store the key metadata associated with each of the plurality of keys, and wherein the key region commences from a first end of the node, and wherein the key metadata region commences from a second end of the node, and wherein the second end is opposite to the first end.

4. The method according to claim 3, wherein the method further comprises:
storing the one or more keys in the key region starting from the first end of the node; and storing the key metadata associated with each of the one or more keys in key metadata region starting from the second end of the node.

5. The method according to claim 3, wherein the node further comprises a safe region positioned between the key region and the key metadata region.

6. The method according to claim 3, wherein the node further comprises a node metadata region comprising information about occupancy of the node.

7. The method according to claim 3, wherein the method further comprises:
receiving a range query call from a KV application; and
servicing the range query call based on the key metadata region.

8. The method according to claim 3, wherein the method further comprises:
receiving a request to delete at least one key from the one or more keys;
deleting the at least one key and the associated key metadata from the node in response to the receiving of the request.

9. The method according to claim 8, wherein the method further comprises performing fragmentation process on the node, wherein the fragmentation process comprises:
updating positions of one or more keys from the one or more keys in the key region; and
updating corresponding key metadata associated with the one or more keys from the one or more keys based on a new position of each of the one or more keys.

10. The method according to claim 9, further comprising:
receiving a further request to store a next key in the node;
determining if a size of the next key is greater than available space in the node; and
performing the fragmenting process if the size of the next key is determined to be greater than the available space.

11. A system comprising:
a processor;
a request handler coupled to the processor, wherein the request handler is configured to receive a request for storing a plurality of keys in a key-value Solid State drive (KV-SSD); and
a memory manager coupled to the processor, wherein the memory manager is configured to perform a storage operation for storing each key of the plurality of keys in a node of a data structure of the KV-SSD, and wherein, in the storage operation, the memory manager is configured to:
allocate a first region in the node for storing the key, such that a size of the first region is equal to a size of the key;
allocate a second region in the node for storing key metadata associated with the key, such that the second region is of a predetermined size; and
store the key in the first region and the key metadata in the second region of the node.

12. The system according to claim 11, wherein the key metadata comprises an offset value associated with the key and a size of the key, wherein the offset value is indicative of a position of the key in the node.

13. The system according to claim 12, wherein the node comprises at least a key region and a key metadata region, wherein the key region is configured to store the plurality of keys, and wherein the key metadata region is configured to store the key metadata associated with each of the plurality of keys, and wherein the key region commences from a first end of the node, and wherein the key metadata region commences from a second end of the node, wherein the second end is opposite to the first end.

14. The system according to claim 13, wherein the memory manager is further configured to:
store the plurality of keys in the key region starting from the first end of the node; and
store the key metadata associated with each of the plurality of keys in key metadata region starting from the second end of the node.

15. The system according to claim 13, wherein the node further comprises a safe region positioned between, the key region and the key metadata region.

16. The system according to claim 13, wherein the node further comprises a node metadata region comprising information about occupancy of the node.

17. The system according to claim 13, wherein the system further comprises a query handler, wherein:
the request handler is configured to receive a range query call from a KV application; and
the query handler is configured to service the range query call based on the key metadata region.

18. The system according to claim 13, wherein:
the request handler is further configured to receive a request to delete the at least one key from the plurality of keys; and
the memory manager is further configured to delete the at least one key and the associated key metadata from the node.

19. The system according to claim 13, wherein the memory manager is further configured to perform a fragmentation process on the node, wherein in the fragmentation process, the memory manager is configured to:
update positions of one or more keys from the plurality of keys in the key region; and
update corresponding key metadata associated with the one or more keys from the plurality of keys based on a new position of each of the one or more key.

20. The system according to claim 19, wherein:
the request handler is further configured to receive a further request for storing a next key in the node; and
the memory manager is further configured to:
determine if a size of the next key is greater than available space in the node; and
perform the fragmenting process if the size of the next key is determined, to be greater than available space.

* * * * *